(12) United States Patent
Walton et al.

(10) Patent No.: US 8,122,290 B2
(45) Date of Patent: Feb. 21, 2012

(54) ERROR LOG CONSOLIDATION

(75) Inventors: Andrew C. Walton, Rocklin, CA (US);
Howard Calkin, Davis, CA (US);
Anurupa Rajkumari, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 69 days.

(21) Appl. No.: 12/641,103

(22) Filed: Dec. 17, 2009

(65) Prior Publication Data

US 2011/0154091 A1    Jun. 23, 2011

(51) Int. Cl.
*G06F 11/00*    (2006.01)

(52) U.S. Cl. ............................... 714/26; 714/48

(58) Field of Classification Search ................ 714/2, 26, 714/20, 25, 47.1, 47.2, 47.3, 48
See application file for complete search history.

(56) References Cited

U.S. PATENT DOCUMENTS

| 5,790,779 | A | 8/1998 | Ben-Natan et al. | |
|---|---|---|---|---|
| 7,055,071 | B2 * | 5/2006 | Austen et al. | 714/48 |
| 7,159,146 | B2 * | 1/2007 | Bowers et al. | 714/37 |
| 7,171,651 | B1 * | 1/2007 | Greenberg et al. | 717/120 |
| 7,225,367 | B2 * | 5/2007 | Hashem et al. | 714/48 |
| 7,509,536 | B1 * | 3/2009 | Kane et al. | 714/46 |

* cited by examiner

*Primary Examiner* — Dieu-Minh Le

(57) ABSTRACT

A system for error log consolidation is disclosed herein. A server computer includes a plurality of system processors and error log consolidation logic. The system processors are configurable to form isolated execution partitions. The error log consolidation logic is configured to, based on detection of a fault in the server, retrieve error logs from the system processors, and to consolidate the retrieved logs with server computer information not available to the system processors to generate a consolidated error log. The consolidated error log includes a comprehensive set of server information relevant to identifying a cause of the detected fault.

20 Claims, 4 Drawing Sheets

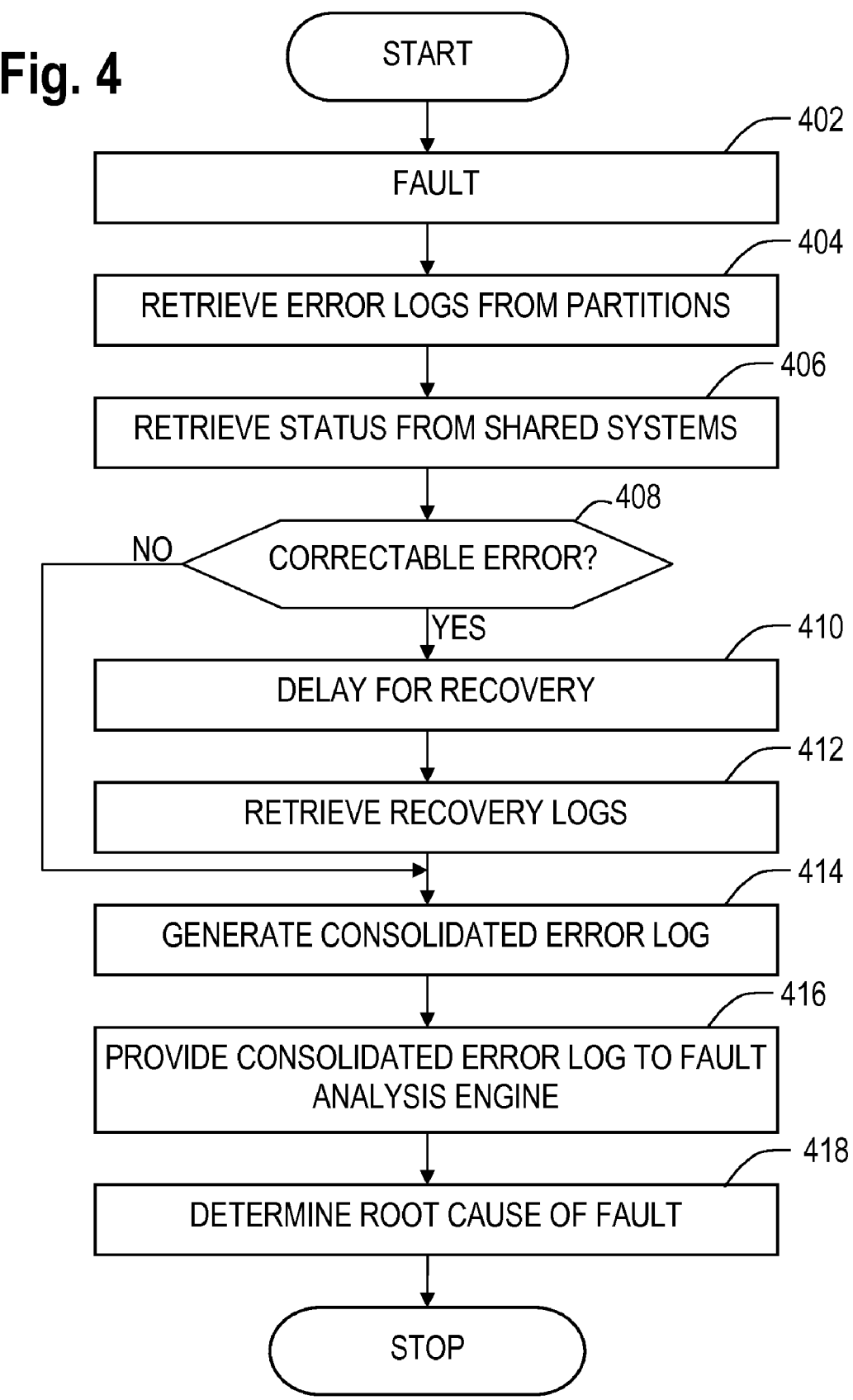

US 8,122,290 B2

ERROR LOG CONSOLIDATION

BACKGROUND

A server computer can include any number of processors. Processors and supporting hardware in a server can be organized (i.e., partitioned) to provide an execution platform for one or more operating systems. Each operating system includes error logging capabilities to, for example, track and record detected faults, effects of a fault, and actions take responsive to a fault. A server hardware fault can induce error logging and/or reporting activities in any number of processors and/or operating systems of the server.

BRIEF DESCRIPTION OF THE DRAWINGS

For a detailed description of exemplary embodiments of the invention, reference will now be made to the accompanying drawings in which:

FIG. 4 shows a flow diagram for a method for generating a consolidated error log in a server computer in accordance with various embodiments.

NOTATION AND NOMENCLATURE

Figure 1:
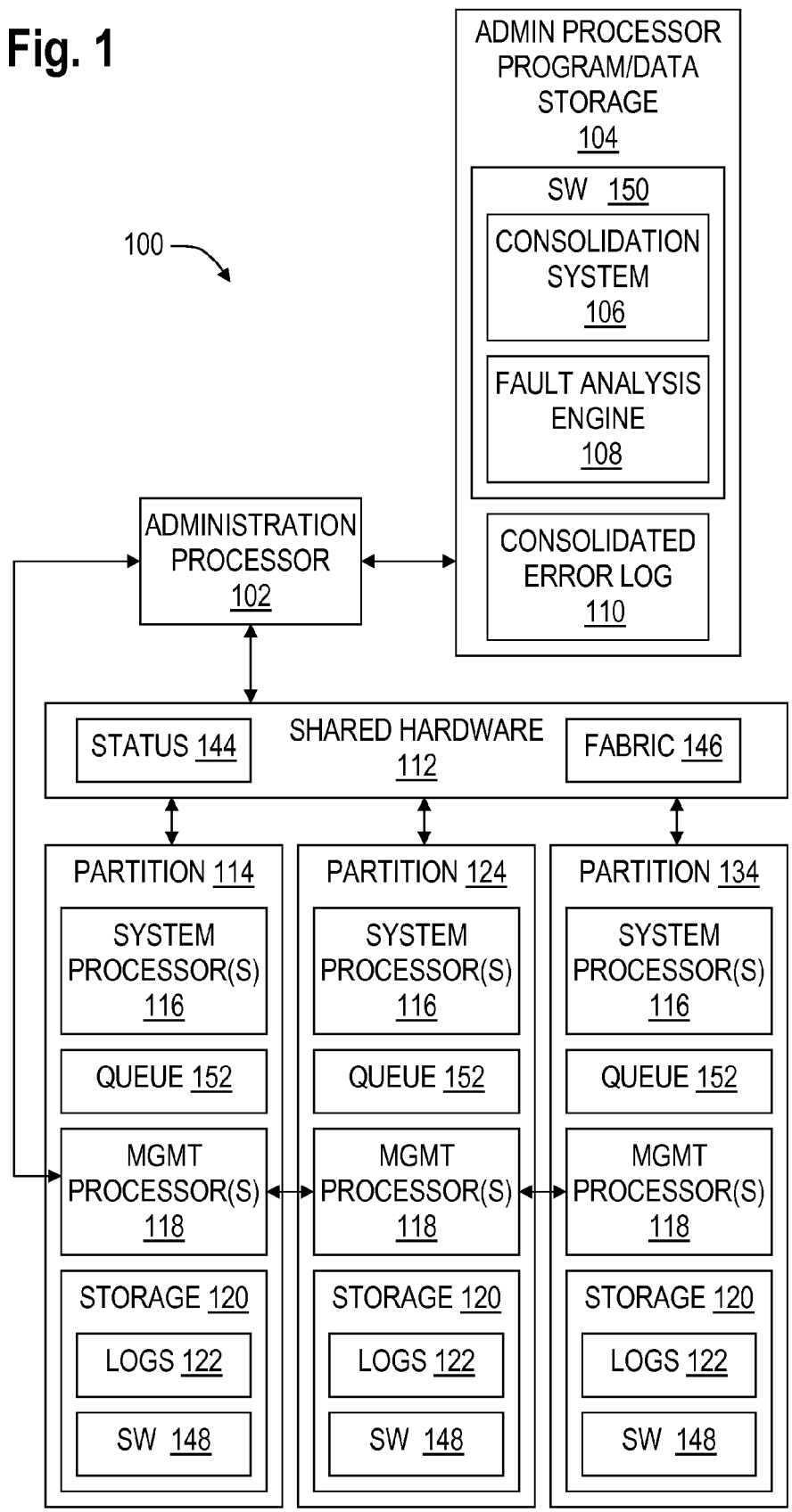
FIG. 1 shows a block diagram of a server computer including error log consolidation in accordance with various embodiments.

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection. Further, the term "software" includes any executable code capable of running on a processor, regardless of the media used to store the software. Thus, code stored in memory (e.g., non-volatile memory), and sometimes referred to as "embedded firmware," is included within the definition of software.

A field replaceable unit ("FRU") is a device or assembly that can be replaced at an operating location of a system in which the FRU is installed (i.e., in the field). A FRU can be replaced quickly and easily without transporting an upper level assembly including the FRU to a repair location to perform the replacement.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

A server computer can be configured to support multiple hard partitions. A hard partition is a set of hardware dedicated to a particular execution environment, such as a particular operating system ("OS"). For security reasons, hard partitions are generally isolated and data sharing between partitions is prohibited. Each hard partition includes at least one processor that accumulates error information relevant to the partition. Similarly, a server can be configured to allow a single set of hardware components to support multiple virtual partitions. Like hard partitions, virtual partitions are isolated. Virtual partitions use software means to provide isolation due to the shared hardware resources. Because the partitions are isolated, a user of the server may need to gather server error information through interfaces associated with each individual partition.

A server computer may also include one or more management processors. Error logging software running on a management processor logs detected errors separately from a partition's system processor. Consequently, a user may need to individually access the management processors in addition to the partitions in order to retrieve error logs. Under such conditions, it is difficult to provide a comprehensive set of error information at a single location so that the information can be analyzed to arrive at a conclusion as to the root cause of fault in the server.

Embodiments of the present disclosure provide a server error logging service that gathers data relevant to a detected fault or other server event from disparate sources of information in the server, and combines the information to form a consolidated error log. The consolidated error log includes substantially all server information relevant to a detected fault. The consolidated error log may be provided to a fault analysis engine that determines likely causes for the fault.

FIG. 1 shows a block diagram of a server computer 100 including error log consolidation in accordance with various embodiments. The server computer 100 includes one or more system processors 116, one or more management processors 118, and one or more data/program storage modules 120. In some embodiments, the system processors 116 and associated components may be embodied in blade computers. Blade computers are modularized computers configured for installation in a blade enclosure. A blade enclosure may support multiple blade computers, and the server computer 100 may include one or more enclosures.

The management processors 118 are independent from the system processors 116. The management processors 118 provide control and administration of various server resources outside the control of the system processors 116. For example, hardware resources shared by multiple system processors 116 may be controlled by a management processor 118 rather than by the system processors 116. In some embodiments, each blade includes a management processor 118.

The storage 120 may be volatile or non-volatile semiconductor memory, magnetic storage, or optical storage. The storage 120 is a computer-readable medium at least a portion of which can be accessed by the system processors 116. Some portions of storage 120 may be accessed by the management processors 118. Some embodiments of the storage 120 include forward error correction that corrects some faulty data provided from the storage 120. Software programming 148 executable by the processors 116, 118 may be included in the storage 120. Some embodiments of the storage 120 include a memory for storing error logs 122 and error logging software that is accessible for error logging even when a partition's operating system is unable to run.

The system processors 116 are allocated to isolated partitions 114, 124, 134. In embodiments wherein the partition 114 comprises a hard partition, hardware means are employed to isolate the partition 114 (i.e., preclude inter-partition communication) from other partitions 124, 134 (e.g., no memory is shared between hard partitions). Alternatively, if the partition 114 comprises a virtual partition, then a processor 116 (e.g., a processor core) of a multi-processor device is allocated to the partition 114 while a different processor 116 of the device is allocated to a different partition 124. When virtually partitioned, no hardware isolation prevents a processor 116 in partition 114 from accessing memory used by partition 124, instead isolation of the virtual partitions is implemented by software. Each partition may execute a different OS and application programs.

The partitions 114, 124, 134 are coupled to shared hardware 112. The shared hardware includes various resources, such as communication links (i.e., fabric links 146) connecting processors 116, processors and memory, and/or processors and other resources, such as networking or input/output devices.

An administration processor 102, also known as an onboard administrator, provides high-level services to the server computer 100. The administration processor 102 provides a point of control for performance of various management tasks, such as configuration of the server components, control of server power and cooling systems, and server level communication. In some embodiments, the administration processor 102 is coupled to the management processors 118 by a dedicated communication link (i.e., a communication link not used by the system processors 116), thereby allowing communication between the administration processor 102 and the management processors 118 when system level communications are disrupted.

The administration processor 102, the management processor 118 and the system processors 116 may be, for example, general-purpose processors, digital signal processors, microcontrollers, etc. Processor architectures generally include execution units (e.g., fixed point, floating point, integer, etc.), storage (e.g., registers, memory, etc.), instruction decoding, peripherals (e.g., interrupt controllers, timers, direct memory access controllers, etc.), input/output systems (e.g., serial ports, parallel ports, etc.) and various other components and sub-systems.

A program/data storage module 104 is a computer-readable medium coupled to the administration processor 102. The storage 102 may be volatile or non-volatile semiconductor memory, magnetic storage, or optical storage. Some embodiments of the storage 104 include forward error correction that corrects some faulty data provided from the storage 104. Software programming 150 executable by the administration processor 102 may be included in the storage 104 (e.g., the consolidation system 106 and fault analysis engine 108).

Providing isolated partitions 114, 124, 134 enhances server security by restricting inter-partition access. Thus, activities in partition 114 do not affect activities in partitions 124, 134. However, inter-partition isolation can be problematic when attempting to identify the source of a fault in the server computer 100. Partitioning precludes inter-partition communication of error logs 122 by system processors 116.

Embodiments of the server computer 100 include an error logging system that transfers error logs 122 generated by the system processors 116, the management processors 118, etc. to a central location where all logs relevant to a detected fault or event are gathered. When a fault is detected in the server computer 100, the consolidation system 106 is executed by the administration processor 102 to retrieve the error logs 122 generated by the processors 116, 118. The consolidation system 106 combines the error logs 122 with server computer information not available to the system processors 116, or in some embodiments, with information available only to the administration processor 102, to construct the consolidated error log 110. The consolidation system 106 may parse the error logs 122 to insure that only information relevant to determining a root cause of the fault is included in the consolidated error log 110. Accordingly, redundant error information may be excluded from the consolidated error log 110. Redundant error information includes, for example, error reports generated by multiple system processors 116 in a partition 114, or by system processors 116 in different partitions 114, 124 that independently log errors related to shared hardware. The fault analysis engine 108 is executed by the administration processor 102 to determine a root cause of the detected fault based on the consolidated error log.

In accordance with various embodiments, the error logging system of the server computer 100 is distributed. Consequently, various elements of the server computer 100 are involved in the process of error logging. The system processors 116, management processors 118, and administration processor 102, each accumulate error information in response to a hardware fault. The distributed error logging system may be notified of a fault via interrupt (e.g., Machine Check Abort signal, Corrected Machine Check interrupt, management interrupt, etc.) directed to a responsible error logging process by a hardware device that detected the fault. In some embodiments, the distributed error logging system polls for faults. Polling may be performed, for example, at a periodic time interval or whenever a partition crashes.

Error information (i.e., error logs) collected on the system processors 116 and the management processors 118 are routed to the administration processor 102 for consolidation with other relevant error logs. Embodiments include queues 152 for channeling error logs created by partition entities (e.g., an OS, or management processor logging process) to a log consolidation system 106 of the administration processor 102. A consolidated log 110 may be provided to fault analysis system 108 for determination of a root cause of a fault.

The consolidated error log may include error information gathered from software 148 executing within a partition 114, 124, 134. For example, the software 148 may include an OS, OS based fault monitoring tools, management processor logging processes, and/or firmware that gather error information. The consolidated error log 110 may also include system state information not associated with a lower level error log. For example, power system information, thermal information, and error recovery information may be included for correlation with a detected fault as part of root cause analysis.

Figure 2:
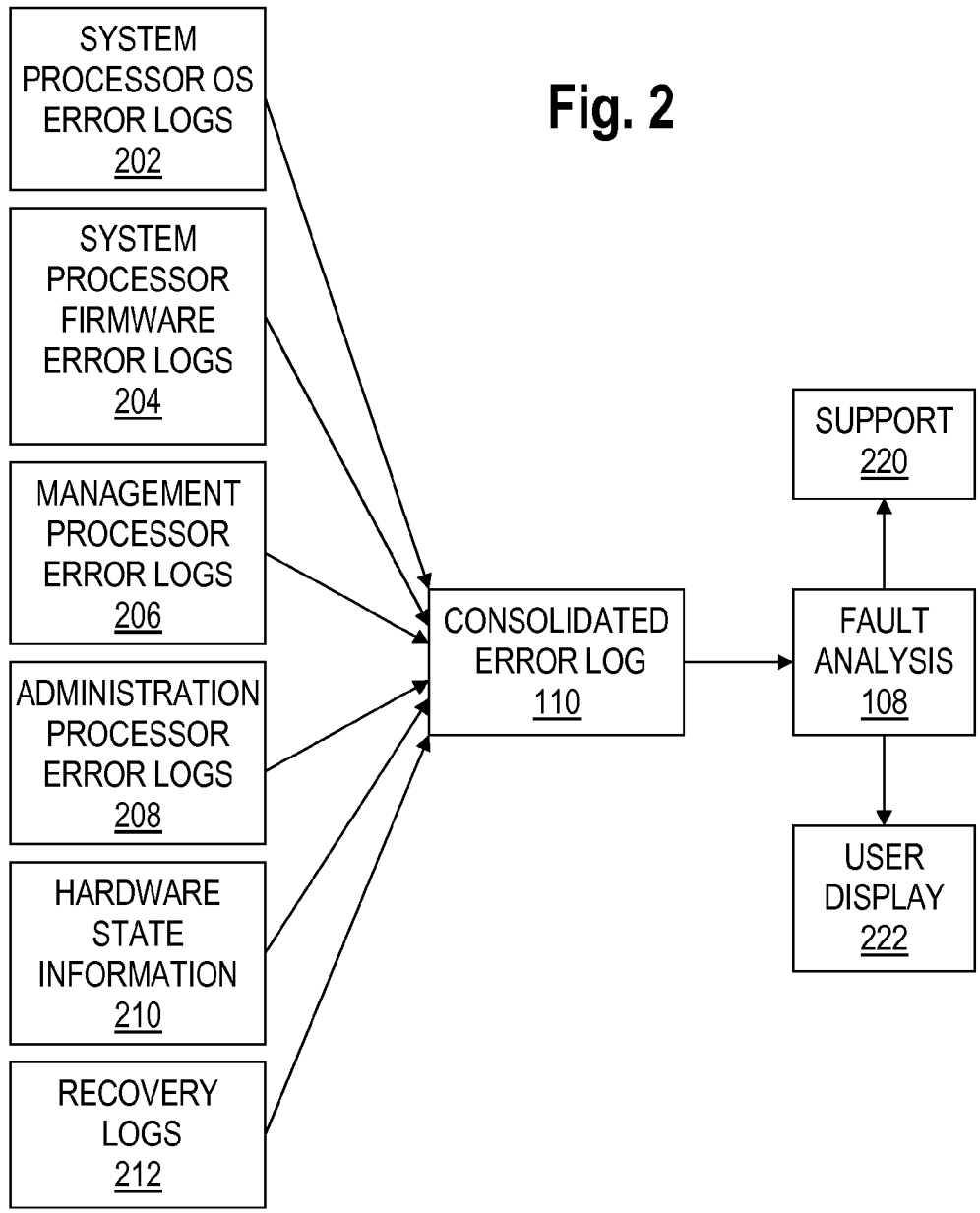
FIG. 2 shows exemplary merging of server computer information into a consolidated error log in accordance with various embodiments.

FIG. 2 shows exemplary merging of server computer information into a consolidated error log 110 in accordance with various embodiments. The consolidated error log 110 includes error information retrieved from various information sources in the server computer 100. The system processor OS error logs 202 include error information gathered by a system processor 116, for example, gathered by OS or application level diagnostics included in the software 148. The system processor firmware error logs 204 include error information logged by firmware executing below the OS, such as system or processor abstraction layer firmware included in the software 148. The management processor error logs 206 include error information retrieved by a management processor 118, such as status 144 of shared hardware (e.g., status of a shared chipset). The administration processor error logs 208 include error information related to server computer systems controlled by the administration processor, for example, cooling system failures, power system failures, etc. Hardware state information 210 includes information related to server operating conditions, such as power supply voltages and currents, system temperatures, etc. Recovery logs include information reporting the steps taken in an attempt to recover from a correctable error, and the success or failure of the operations. The recovery logs 212 may be included in at least one of logs 202-206 in some embodiments.

The consolidated error log 110 may be provided to the fault analysis engine 108 for determination of a root cause of the fault initiating the error information logging. Thereafter, fault and/or error information can be provided to a support system to initiate service, for example, replacement of a defective FRU, or to a user of the server computer 100.

Embodiments provide logging of error information derived from faults that when detected by one or more partitions preclude further system operation (e.g., a global machine check abort). Such faults can be difficult to log for a number of reasons. Such faults can create error logs in multiple devices in a partition. Hardware that caused the fault may no longer be responding, and therefore, it may be impossible to log errors in such hardware. Communication links may have caused the fault, for example, processor to memory links, and memory may be unusable.

In embodiments of the present disclosure, system processors 116 log error information to the queue 152, which may be a "fire and forget" queue. A fire and forget queue allows the processor 116 to write the error information to the queue for delivery to the consolidated error log 110 without further involvement of the processor 116. Management processors 118 gather the queued error information. When the system processors 116 and the management processors 118 have logged errors, the system processors 116 may attempt to correct the errors. Error logs are delivered from the management processors 118 to the administration processor 102 for consolidation and fault analysis.

In some cases, firmware or an OS included in software 148 executed by the system processors 116 can recover from a detected fault and the partition 114, 124, 134 can continue operating. However, the fault should be handled expeditiously to avoid unpredictable behavior in the OS or application programs. In some embodiments of the server 100, software that attempts fault recovery, for example, system abstraction layer firmware of a partition, can "fire and forget" an error log into the queue 152 coupled to a management processor 118. After queuing the error log, the firmware can continue fault recovery. The management processor 118 can gather the queued error log and deliver the log to the error consolidation system 106 executed by administration processor 102 without further interaction with the system firmware.

Some recoverable faults may be the root cause of a crash event even though they are normally corrected. The present logging system is configured to identify generally correctable faults that cause uncorrectable faults. For example, a fabric link failure may be corrected by rerouting and retransmitting a packet. If, however, no alternate routing path is available, a partition 114 may crash. When a correctable fault is detected, the consolidation system 106 waits a predetermined time interval to determine whether the fault is corrected. The time interval is based on the type of fault detected. If the fault is corrected, the error information accumulated with regard to the correctable error is presented to the fault analysis engine 108. On the other hand, if the generally correctable fault cannot be corrected, then the information gathered about the correctable error is consolidated with information about the uncorrected error (e.g., the recovery logs) and the consolidated log 110 is presented to the fault analysis engine 108. Management processors 118 can log error information provided from various server hardware (e.g., server chipsets) even if fabric links are inoperable because the management processors 118 use a dedicated communication link to connect to server devices.

Figure 3:
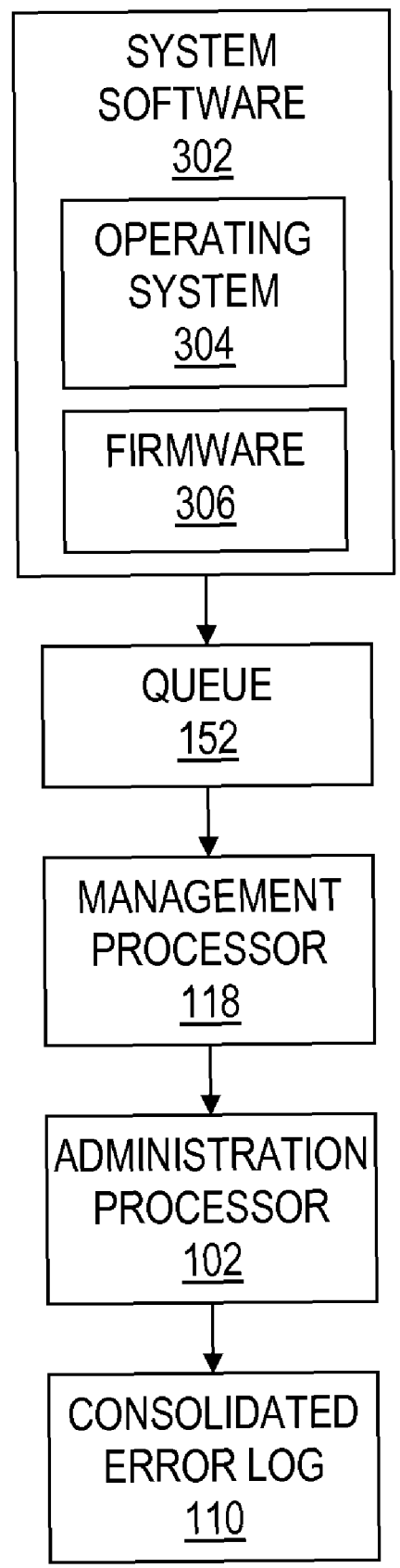
FIG. 3 shows a diagram of error log flow from system software to the consolidated error log.

FIG. 3 shows a diagram of error log flow from system software to the consolidated error log 110. The system software 302 is included in software 148 and executed by the system processors 116. The system software 302 comprises various software modules, including an OS 304 and firmware 306. OS 304 and/or firmware 306 may generate system error logs based on notification of a hardware fault. System error logs provided by the OS 304 and/or firmware 306 may be written to the queue 152. To facilitate rapid error recovery, the queue 152 may be a fire and forget queue. After the system error logs are written to the queue 152, the system software 302 is free to perform processing tasks unrelated to log delivery.

The management processor 118, via execution of logging software (included in software 148) executed therein, reads the system logs from the queue 152, and transfers the system logs to the administration processor 102. The management processor 118 also retrieves error information from various sources under its control, generates management logs therefrom, and transfers the management logs to the administration processor 102.

The administration processor 102 gathers server level information, such as environmental information, and error information related to device controlled by the administration processor 102, and bundles the server level information with the management and system logs to form the consolidated error log 110.

FIG. 4 shows a flow diagram for a method for generating a consolidated error log in a server computer in accordance with various embodiments. Though depicted sequentially as a matter of convenience, at least some of the actions shown can be performed in a different order and/or performed in parallel. Additionally, some embodiments may perform only some of the actions shown. In some embodiments, the operations of FIG. 4, as well as other operations described herein, can be implemented as instructions stored in a computer-readable medium and executed by a processor.

In block 402, the server computer 100 is operational and the system processors 116, management processors 118, administration processor 102, and other server systems are performing various processing operations. A hardware fault is detected. A detected hardware fault may include, for example, a memory error or error related to a processor, circuitry, or device of the server computer 100 (e.g., a FRU). A device responsible for logging the detected fault is notified. Notification may be by interrupt, polling, response timeout, etc. The device notified can vary based on the fault detected. For example, a system processor 116 can be notified regarding one type of fault, while a management processor 118 is notified regarding a different type of fault. A detected fault may be correctable or uncorrectable.

Responsive to fault notification, a device (e.g., processor 116) generates an error log containing information related to the fault. Some faults, for example faults in shared hardware, may result in notification of multiple logging entities, and correspondingly generation of multiple error logs. Additionally, a logging device may read fault information from hardware, resulting in a reset of the hardware stored fault information. Consequently, only the logging device that first reads the hardware is able to retrieve and log the fault information. Servers lacking a consolidated error log 110 spread such errors across partition logs preventing fault analysis from accurately determining the number of faults occurring in the hardware.

In block 404, the administration processor 102 retrieves error logs generated within the isolated partitions of the server computer 100. Such error logs include error logs generated by the system processors 116 by execution of system software 302. System processor 116 generated error logs may be retrieved via a management processor 118 associated with a partition (114, 124, 134).

In block 406, the administration processor 102 retrieves error logs generated by the management processors 118. Such error logs may include information related to shared hardware 112, including a server communication fabric 146 connecting various server 100 components. The administration processor 102 also retrieves information regarding components controlled by the processor 102, for example power and cooling systems, and retrieves server 100 environmental information. Based on the information in the error information, the administration processor 102 may determine that further action should be taken by a partition processing entity, e.g., a system processor 116. For example, the administration processor 102 may initiate a recovery operation in a system processor 116.

In block 408, the administration processor 102 determines, based on the retrieved error logs for example, whether the detected fault is correctable. If the detected fault is correctable, then in block 410, the administration processor 102, delays generation of a consolidated error log 110 for a time interval. The time interval is based on the type of fault detected. For example, if a fault in the fabric link 146 was detected, then the delay includes a time interval sufficient for a transmitting partition (e.g., the system and management processors 116, 118 of partition 114) to attempt to reconfigure the fabric at avoid a faulty link and retransmit a packet. A different fault may use a different delay interval.

In block 412, the administration processor 102 retrieves recovery logs. The recovery logs detail the operations performed to correct the detected fault, and indicate whether the fault has been corrected. If the recovery logs indicate that the recovery operations failed to correct the detected fault, then the detected fault is deem uncorrectable.

In block 414, the administration processor 102 generates a consolidated error log 110. The consolidated error log 110 includes all of the information available in the server computer 100 that is relevant to the detected fault. If the fault was determined to be correctable, and the recovery logs indicate failure of the recovery operations, then the consolidated error log 110 may include the recovery logs. If the recovery logs indicate success of the recovery operations, the consolidated error log 110 may not include the recovery logs.

In block 416, the consolidated error log 110 is provided to the fault analysis engine 108. The fault analysis engine 108 processes the consolidated error log 110 and determines a root cause of the detected fault in block 418. A support organization and/or a server user may be notified of the fault and the determined root cause.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A server computer, comprising:
a plurality of system processors configurable to form isolated execution partitions;
error log consolidation logic configured to, based on detection of a fault in the server, retrieve error logs from the system processors, and to consolidate the retrieved logs with server computer information not available to the system processors to generate a consolidated error log;
wherein the consolidated error log includes a comprehensive set of server information relevant to identifying a cause of the detected fault.

2. The server computer of claim 1, further including a fault analysis engine;
wherein the fault analysis engine is configured to determine a root cause of the detected fault based on the consolidated error log;
wherein the error log consolidation logic is configured to delay provision of the consolidated error log to the analysis engine until a recovery operation responsive to the detected fault is complete.

3. The server computer of claim 2, wherein the delay comprises a selectable time interval determined based on the detected fault.

4. The server computer of claim 2, wherein the detected fault indicates a correctable error, and failure of the recovery operation indicates an uncorrectable error, and the consolidated error log includes error logs generated for both the correctable and uncorrectable errors.

5. The server computer of claim 2, wherein the detected fault indicates a correctable error, and the consolidated error log includes a record of the results of, and the steps performed as part of, the recovery operation.

6. The server computer of claim 1, wherein the error log consolidation logic is configured to include server environmental information in the consolidated error log.

7. The server computer of claim 1, further comprising a plurality of distributed management processors and queues configured to store error logs written by the system processors for retrieval by the distributed management processors while the system processors execute a recovery operation based on the detected error.

8. The server computer of claim 1, wherein the error log consolidation logic retrieves a given error log generated by a given system processor via a management processor located in a partition with the given system processor.

9. The server computer of claim 1, wherein error information generated by a server computer hardware resource shared by multiple partitions is retrieved directly from the hardware resources by a management processor coupled to the hardware resource and to the error log consolidation logic.

10. A method, comprising:
detecting, by a server computer, a fault in the computer;
retrieving, by an administration processor of the computer, error logs generated by a plurality of system processors of the computer; and
combining the retrieved error logs with computer information not available to the system processors to construct a consolidated error log comprising a comprehensive set of server information relevant to identifying a cause of the detected fault.

11. The method of claim 10, wherein the combining comprises eliminating redundant error information from the consolidated error log.

12. The method of claim 10, further comprising:
providing the consolidated error log to a fault analysis engine executed by the administration processor; and
determining a root cause of the detected fault based on the consolidated error log.

13. The method of claim 12, further comprising: delaying the providing, by the administration processor, until a recovery operation responsive to the detected fault is complete, wherein a time of the delay comprises a time interval selected based on the detected fault.

14. The method of claim 10, further comprising:
detecting, wherein the detected fault is a correctable error, failure of a recovery operation performed to correct the detected fault, wherein failure of the recovery operation indicates an uncorrectable error; and
including in the consolidated error report, error logs generated for both the correctable and uncorrectable error.

15. The method of claim 10, wherein including error logs for the uncorrectable error comprises including in the consolidated error log, a record of the results and the steps performed as part of a recovery operation initiated to correct the detected fault.

16. A computer-readable medium encoded with a computer program comprising:
instructions that when executed cause a processor in a computer to:
retrieve error logs generated by a plurality of system processors of the computer responsive to a detected fault in the computer;
combine the retrieved error logs with computer information not available to the system processors to construct a consolidated error log comprising a comprehensive set of information relevant to identifying a cause of the detected fault; and
determine a root cause of the detected fault based on the consolidated error log.

17. The computer-readable medium of claim 16, further comprising instructions that when executed cause the processor to eliminate redundant error information, provided in the retrieved error logs, as part of constructing the consolidated error log.

18. The computer-readable medium of claim 16, further comprising instructions that when executed cause the processor to delay construction of the consolidated error log until a recovery operation responsive to the detected fault is complete, wherein a time of the delay comprises a time interval selected based on the detected fault.

19. The computer-readable medium of claim 16, further comprising instructions that when executed cause the processor to:
determine whether the detected fault is a correctable error or an uncorrectable error;
determine, based on the fault being a correctable error, whether a recovery operation performed to correct the fault has failed, wherein failure of the recovery operation indicates an uncorrectable error;
include in the consolidated error report, error logs generated for both the correctable and uncorrectable error; and
include in the consolidated error log, a record of the results and the steps performed as part of a recovery operation initiated to correct the detected fault.

20. The computer-readable medium of claim 16, further comprising instructions that when executed cause the processor to include computer environmental information in the consolidated error log.

* * * * *